March 14, 1944. J. OPIE 2,344,054
ATTACHMENT FOR HAM STUFFING PRESSES
Filed Feb. 1, 1941
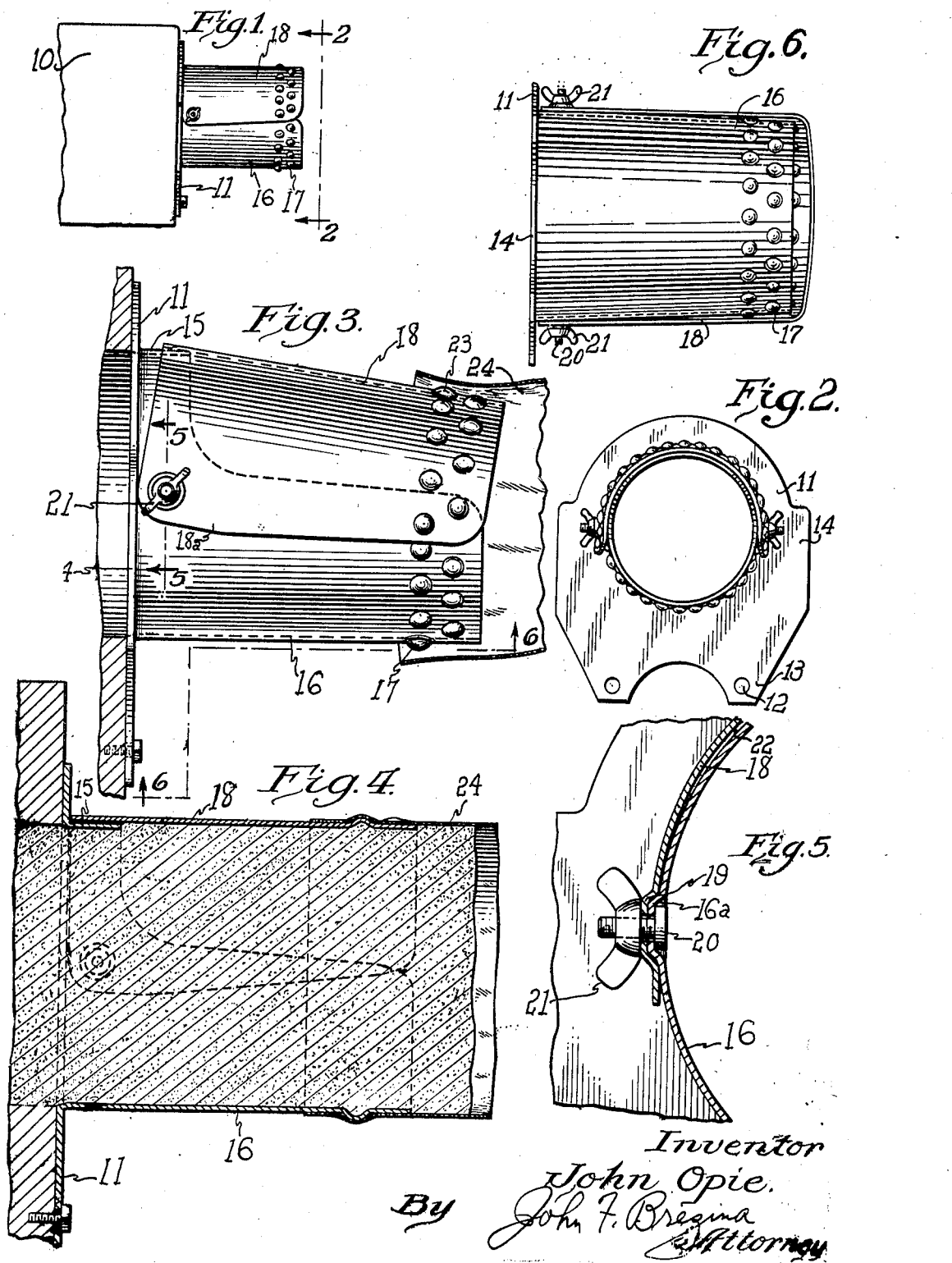
Inventor
John Opie.
By John F. Bregina
Attorney Patented Mar. 14, 1944

2,344,054

UNITED STATES PATENT OFFICE 2,344,054

ATTACHMENT FOR HAM STUFFING PRESSES

John Opie, Chicago, Ill.

Application February 1, 1941, Serial No. 376,977

2 Claims. (Cl. 226—18)

My invention is directed to devices for facilitating the insertion of a body of meat, food product or manufactured products in general into a flexible covering in which the prepared or manufactured product is adapted to be marketed, the said covering taking either the form of a tubular or cylindrical sausage casing or of a flexible bag, receptacle or protective covering.

In the processes of preparing hams, certain sausages, and other food and meat products for market, it is the custom to form the meat body into either substantially cylindrical, oval, or rounded shapes which are in most instances enclosed within either a casing or bladder or within substantially cylindrical synthetic casings usually made of suitable cellulosic material. In other instances, the partially or fully prepared meat body is enclosed within fabric and other flexible coverings simulating bags. As it is an important factor that the meat or food body fit relatively snugly and tightly within the protective and retaining covering or receptacle within which it is displayed and marketed, the mounting of the casing or covering and the insertion of the food body thereinto is a tedious and time-taking step which in numerous instances is done improperly to result in a ham or sausage unit undesirable in appearance due to air pockets under portions of the casing and due to uneven stretching and outward projection of one or more meat portions creating "bumps" and an unattractive ham or sausage.

In the presently known steps of sausage and ham manufacture, the meat body is first pressed into substantially the desired form which in the case of boiled hams is either round and cylindrical or substantially rectangular with rounded corners and ends, and the meat body so pressed or formed is ejected from the press and at the time of such ejection the tube-like casing, either natural or synthetic, is manually pulled over the meat body from one end thereof toward the other and then in many instances the one or more ends of the casing tied by string or fastened by equivalent means. In this step, the natural tendency of muscles in the case of hams or portions of the meat body where the meat is finally divided has a tendency to expand outwardly and irregularly according to the degree to which portions of the meat body has been compressed, and this expansion tendency has made the mounting of tubular and cylindrical synthetic as well as natural casings a time-taking and comparatively difficult procedure.

It is an object of my invention to provide a device which is preferably, though not necessarily, adapted to be attached to the outlet end of a sausage, ham or food press which provides a spout-like device through which the ejected meat unit is forced by the press and which device includes one or more substantially semi-cylindrical members pivotally secured to suitable mounting means therefor and which provide for quick and easy placement and formation of gradually decreasing passage defined by one or more of such pivoted members terminating in an opening or mouth of substantially smaller area than the entrance of the ends thereof, and which provide for convenient and quick gripping engagement of a tubular casing to hold the latter during the meat body inserting operation.

A further important object of my invention is the provision of a device of the aforedescribed class which may be mounted to the exit end of either a ham press or a work table and which includes a stationarily mounted elongated lip of arcuate form and a cooperating pivotally mounted arcuate metal member which is positionable to provide a gradually inclined and reduced outlet opening to permit convenient placement thereon of one end of a casing or the like whereby the casing will be held by the expansive movement of one or more of said members until the meat body is fully inserted within the casing.

A further object of my invention is the provision of a nozzle-like unit through which a meat body to be packaged or enclosed within a covering is adapted to be pressed or pushed and which has one or a plurality of cooperating metal members of substantially arcuate transverse cross section and which are pivotally mounted and normally pressable into positions wherein the outlet defined by adjacent ends of said members will be smaller than the inlet end of said device so as to permit quick and easy slipping thereon of one end of a tube-like casing or covering, and which are adapted to be expanded or moved apart by the meat body itself to cause temporary holding of the tube-like casing in desired positions.

Other and further important objects of my invention will be apparent from the description and appended claims.

My invention is illustrated in the accompanying drawing, reference being made thereto in the following description.

On the drawing:

Fig. 1 is a side elevational view of one preferred form of my device illustrated as mounted upon a portion of a food, ham press or work table.

Fig. 2 is an enlarged view taken on line 2—2 of Fig. 1.

Fig. 3 is an enlarged side elevational view showing one preferred form of my unit with the pivotally mounted cover member in lowered position and a section of a typical casing slipped thereon.

Fig. 4 is an enlarged cross section view taken on a vertical plane longitudinally of one form of my invention and showing the pivotally mounted arcuate cover member in position as upraised by the entering end of a meat, ham or sausage body and showing how the outlet end of my device engages and holds a typical casing into which the ham or other meat body is usually inserted.

Fig. 5 is an enlarged cross sectional view taken on line 5—5 of Fig. 3.

Fig. 6 is a view taken on line 6—6 of Fig. 3 and looking at the under portion of one preferred form of my invention.

Referring to Figs. 1 to 6 inclusive, reference numeral 10 in Fig. 1 is merely illustrative of and designates a walled portion of either a sausage or ham stuffing machine, press, work table or bench which may be provided with one or more vertically extending end and side rails. The fragment indicated by reference numeral 10, whether forming a part of a sausage or ham press or work table, is provided with a suitable outlet opening of a size which conveniently permits passage and projection therethrough of meat bodies or hams of a desirable size, said opening not being specifically shown but merely explained to illustrate a typical example. In instances where ham presses are used, the machine is provided with suitable mechanism for pushing the elongated body of pressed-together meat through such outlet opening, after which the usual casing forming a suitable covering is mounted upon the same.

Reference numeral 11 designates a substantially annular collar member formed of suitable sheet metal or strip steel and which may be of varied shape. The metal collar member 11 is in the preferred form illustrated as preferably provided with apertures 12 formed in downwardly extending integral projection portions 13 of said collar member. The side portions of the collar member 11 are preferably formed with straight edges which normally extend vertically when the unit is in mounted position, these lateral edge portions being designated by numeral 14 and they provide means whereby the device is removably mounted between a pair of metal hook-like brackets (not shown) so as to securely hold the device in position on the press, work table, etc.

An annular flange 15, which is preferably formed integral with the metal collar 11, normally extends angularly and preferably substantially perpendicularly from the inner annular edge of the metal collar 11 as clearly shown in the drawings. This flange preferably extends a relatively short distance outwardly and has formed integral with its lower portion a substantially semi-cylindrical chute, spout or lip member 16 which extends outwardly and normally in a substantially horizontal direction a distance of not less than several inches, preferably distances ranging from 5 to 8 inches from the metal collar 11. The outer end portion of the lip member or spout 16 is provided with a plurality of spaced apart outwardly extending bosses, lugs or projecting elements 17 which are preferably formed in spaced apart and staggered positions by striking and pressing out relatively small areas of the end portions of the chute, spout or lip member 16 with a suitable die. These projecting elements 17 are preferably blunt and rounded so that when they engage the inner surfaces of flexible relatively flat fragile casings or coverings into which the ham or meat body is inserted, they will not injure same.

Reference numeral 18 designates a substantially semi-cylindrical metal lip member or hood whose corners are preferably rounded and which is approximately of a length equal to the distance from metal collar 11 to the outer edge of chute or lip member 16. The hood or lip member 18 is formed to an arc or diameter slightly greater than the diameter of the spout or lip member 16 so that said hood or lip member 18 may be superposed or nested in the positions illustrated in the drawings wherein the lateral edges 18a of hood 18 normally overlap the upper edge portions of the spout or lip member 16.

The hood 18 is provided with outwardly pressed bosses 19 at diametrically opposite points which are provided with central apertures therein, and said outwardly struck apertured bosses 19 are normally positioned in nested overlapping relation over the bosses 16a of chute or lip member 16. Number 20 designates a pair of fastening elements, for example, suitable headed bolts which are passed through the registering apertures or bosses 16a and 19 and are releasably secured in position by wing nuts 21.

It is to be noted, particularly as illustrated in the upper portion of Fig. 5, that the diameter and dimension of the arcuate end of hood 18 which overlies metal flange 15 is greater than corresponding dimension of the adjacent portion of collar 15 and that a clearance designated by numeral 22 is maintained between the latter to permit relatively easy movement, both gravity-actuated and manual, of the pivotally mounted hood or lip member 18.

The hood or arcuate cover member 18 is preferably, though not necessarily, provided with a plurality of spaced apart outwardly directed projections or projecting elements 23 which are preferably formed by striking outwardly with a die relatively small portions of the metal hood itself at various points near the outer end thereof. These projecting elements, studs, lugs or bosses are preferably blunt and rounded so as to permit easy slipping on and withdrawing movement of one end of a flexible tube-like casing or covering into which the ham or meat body is to be inserted. I desire to point out that the friction which may occur between the outwardly struck apertured bosses 16a and 19 at the point of pivot of hood 18 is relatively minor and insignificant and that in the form illustrated in Figs. 1 to 6 inclusive the weight of the pivoted hood 18 will normally cause it to fall into the overlapping inclined position illustrated in Fig. 3. In said inclined position it will be noted that the outlet vent or mouth defined by the outer ends of the hood or cover member 18 and chute or lip member 16 is of smaller dimension than the inlet opening defined by the flange 15 through which the ham or other meat body enters.

In Fig. 3 there is illustrated a fragment of a typical tube-like casing 24 which is generally formed of substantially transparent cellulosic material and which the operator manually slips over the outer ends of the device to substantially the position illustrated in Fig. 3 and as the ham or other meat body is pushed into and through the device, the ham or meat body being of cross-sectional dimension and size to snugly pass through the opening of collar 11 and flange 15, the upper portion of the ham or meat body engages the inner surface of the cover or hood member 18 to upraise the latter and cause the engagement and gripping of the inner surface of the tube-like casing in the manner illustrated in the cross sectional view of Fig. 4. In this action, the spaced projecting elements 23 and 17 slightly flex portions of the casing outwardly to thereby hold said casing in the said mounted position as the ham or meat body is pushed completely into the casing 24.

In the use of the invention, the operator will normally press together the two aforedescribed pivoted units to the inclined cooperating positions illustrated in Fig. 3 whereupon one end of the flexible casing is drawn thereover. The outer end portions of the hood 18 and chute or lip member 16 when spread apart, will cause the projecting elements 23 and 17 to engage the inner surface of the flexible casing and temporarily hold the same as the meat body is pushed fully into the casing, whereafter the operator may merely pull off the casing-enclosed ham or meat body and tie or otherwise suitably fasten the end of the flexible casing in the conventional manner.

In instances where containers which are formed of material sufficiently rigid to be held manually in the desired position, as for example metal containers, the hood 18 may be entirely removed by removal of the two pivoting bolts 20, and in such instances the pressed ham or pressed food body may be satisfactorily moved merely along and through the lower lip member 16 directly into such containers.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In a device for facilitating the insertion of a ham or the like within a tube-like covering, a substantially flat mounting plate having a passage through which a food body may be passed; an annular angular extending flange integral with said plate; a substantially semi-cylindrical lower lip projecting outwardly from said flange; a substantially semi-cylindrical upper lip member pivotally mounted at one end thereof to said lower lip and having its lateral edges normally overlapping the lateral longitudinal edges of said lower lip, said upper lip member being pivoted to permit selective positioning thereof into downwardly and outwardly inclined positions to define a frustum shaped passage therethrough, and spaced blunt projecting elements on the outer surface of said lower and upper lips adapted to engage a tube-like covering.

2. In an outlet attachment for facilitating the insertion of a ham or the like into a flexible tube-like casing, a substantially flat mounting plate adapted to be removably mounted on the outlet end of a stationary work unit, said plate having a passage therethrough; an angularly extending and upwardly opening arcuate lower lip member extending outwardly from said mounting plate; said plate having an arcuate outwardly extending flange integrally joining said lip member thereto; said lip member and said flange being disposed about said mounting plate opening; a substantially semi-cylindrical cover member pivoted at one end to said upwardly opening arcuate lower lip member and normally defining a tube-like passage with said lip member removable; and pivoting elements releasably connecting said upper cover member to said lip member, said cover member being placeable into positions to define a substantially frustum shaped passage to facilitate placement of one end of a flexible casing over the ends of said lip member and said cover member.

JOHN OPIE.